United States Patent [19]

Zhang et al.

[11] Patent Number: 5,586,222

[45] Date of Patent: Dec. 17, 1996

[54] METHOD OF STORING ASSOCIATIVE INFORMATION AND A DEVICE THEREFOR

[75] Inventors: Wei Zhang; Toshinao Ishii; Masanobu Takahashi; Kazuo Kyuma, all of Hyogo, Japan

[73] Assignee: Mitsubishi Denki Kabushiki Kaisha, Tokyo, Japan

[21] Appl. No.: 324,378

[22] Filed: Oct. 17, 1994

Related U.S. Application Data

[63] Continuation of Ser. No. 910,555, Jul. 8, 1992, abandoned.

[30]     Foreign Application Priority Data

Jul. 24, 1991 [JP] Japan ................................. 3-184300
Oct. 21, 1991 [JP] Japan ................................. 3-272489

[51] Int. Cl.$^6$ ................................................ G06F 15/18
[52] U.S. Cl. ................................................ 395/22; 395/24
[58] Field of Search ................................. 395/4, 24, 26, 395/22, 27, 11

[56]              References Cited

U.S. PATENT DOCUMENTS

| | | | |
|---|---|---|---|
| 3,723,979 | 3/1973 | Mundy | 395/11 |
| 4,777,622 | 10/1988 | Palm et al. | 395/11 |
| 4,802,103 | 1/1989 | Faggin et al. | 395/26 |
| 4,943,556 | 7/1990 | Szu | 395/26 |
| 4,961,615 | 10/1990 | Owechko et al. | 395/11 |
| 4,977,540 | 12/1990 | Goodwin et al. | 395/11 |
| 5,034,918 | 7/1991 | Jeong | 395/11 |
| 5,053,974 | 10/1991 | Penz | 395/26 |

OTHER PUBLICATIONS

J. J. Hopfield, "Neural Networks and Physical Systems with Emergent Collective Computational Abilities", *Proceedings of the National Academy Sciences*, 1982, pp. 461–464.

*Primary Examiner*—Allen R. MacDonald
*Assistant Examiner*—Richemond Dorvil
*Attorney, Agent, or Firm*—Burns, Doane, Swecker & Mathis, LLP

[57]              ABSTRACT

An input pattern or two-dimensional pattern is associated and stored with use of associative matrices having the same size as that of an input pattern without converting it into one-dimensional pattern, wherein the associative matrices are generated from the input pattern so as to maximize the Hamming distance between state invariants which correspond to each different storage pattern, and thereby a power of categorization that corresponds to each storage pattern can be enhanced, thus increasing the storage capability and robustness.

9 Claims, 5 Drawing Sheets

F I G. 5
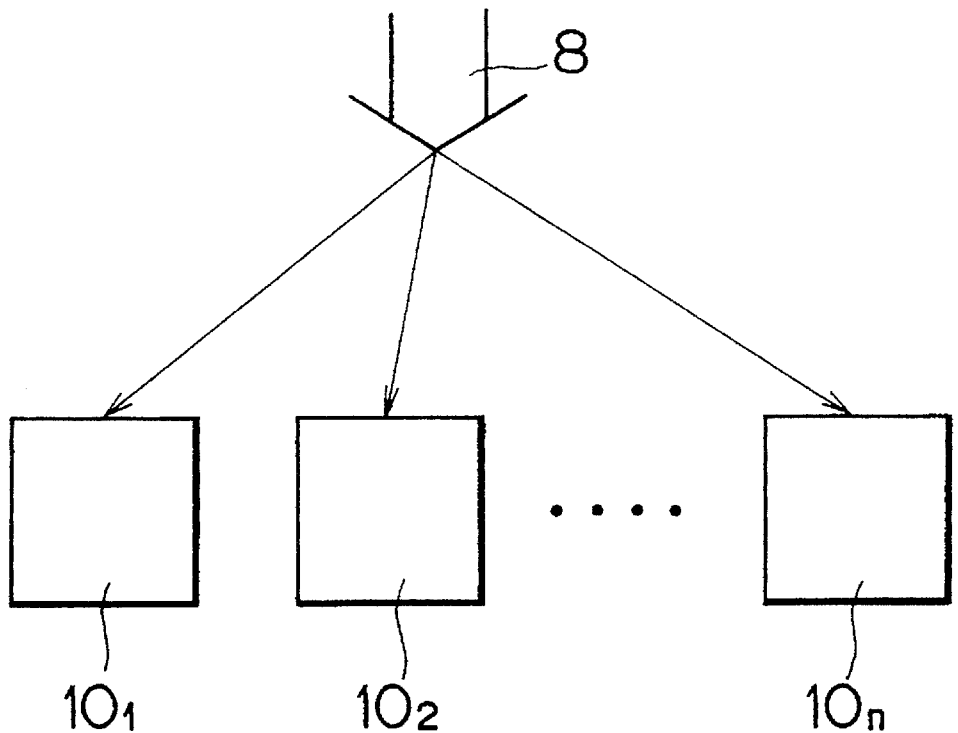

METHOD OF STORING ASSOCIATIVE INFORMATION AND A DEVICE THEREFOR

This application is a continuation, of application Ser. No. 07/910,555, filed Jul. 8, 1992, now abandoned.

BACKGROUND OF THE INVENTION

1. Field of the Invention

This invention relates to neural networks and, more particularly, to a method of storing associative information in neural networks and a device therefor.

2. Description of the Prior Art

An associative information storage algorithm in the neural networks can be described by utilizing state transition dynamics of the neural networks with an associative matrix "W" and state vector "X" of the neural networks, such as disclosed in, for example, J. J. Hopfield, "Neural networks and physical systems with emergent collective computational abilities" Proceedings of the National Academy of Sciences 79, pp. 2554–2558.

The state transition dynamics are normally defined by $$x(t+1)=f\{Wx(t)\} \quad (1)$$

where, x(t) indicates a state of the neural networks at a time t.

A typical conventional associative information storage system is shown in FIG. 1, and FIG. 2 illustrates a nonlinear function of state change of the associative information storage system of FIG. 1.

Now referring to FIG. 1, block 30 designates interconnection type neural networks for storing associative matrices, block 4 designates a state input connecting unit, block 5 designates a state output connecting unit and block 6 designates a conversion unit of the type for converting data in accordance with the nonlinear transform function "f" defined by equation (1) above, whereby an associative information storage circuit 20 is formed of the neural networks 30, the state input connecting unit 4, the state output connecting unit 5 and the conversion unit 6. Further, block 7 designates an external device coupled to the associative information storage circuit 20 for storing a state of the associative information storage circuit 20, and block 80 designates an initial value input unit to provide the associative information storage circuit 20 with an initial state.

Heretofore, the associative matrix has been provided by a sum of autocorrelation matrices of storage patterns gained through a nonlinear transform function, such as a step function shown in FIG. 2, a sigmoid function shown in FIG. 3 and the like.

The essential operation of the associative information storage device will now be described hereinafter.

In accordance with the associative matrices as described above, since a storage pattern takes part of an invariant of equation (1), the storage pattern may be stored in the associative matrices as the invariant of the state transition dynamics. In addition to this, the storage pattern can be associated from the input pattern through a convergence point by providing the state with a transition in accordance with equation (1) on the condition that the input pattern is used for the initial value of the neural networks and by making use of the characteristic such a state of the neural networks will coincide with the storage pattern when a sufficient time has elapsed after the commencement of a state transition from an initial state provided that the initial state is little different from the storage pattern of equation (1).

The neural networks 30 which constitute part of the associative information storage circuit 20 as described above may be realized by utilizing an integrated circuit in accordance with an optical and electronic method. The realization of such neural networks will be described in more detail hereinafter.

An optical filter having a distribution of light transmittance, which is equivalent to the associative matrices, is formed on a two-dimensional plane indicated by the neural networks 30 of FIG. 1, and then the formed optical filter is interposed between a light source, which constitutes an input pattern, and a photo-detector to compute a result.

The operation of the neural networks 30 will be described hereinafter. The light emitted from the light source corresponding to the input pattern passes through the optical filter, which has a distribution of light transmittance that corresponds to a supplementary matrix. Since each element of the optical filter has a light transmittance that corresponds to a coupling power between the light source and the photo-detector, the strength of the light which has passed through the optical filter is equal to a product of the light intensity of the light source and the light transmittance of each optical filter element, whereby the light transmittance corresponds to the respective coupling power. The photo-detector outputs a signal by adding the light intensity of the light emitted from all of the elements of the light source that passed through the optical filter. Accordingly, it is possible to find a product of the associative matrices and a vector indicating the state input by use of the optical system which constitutes the neural networks 30.

Since the prior art associative information storage device has a configuration as described above, there have been problems in that it requires neural networks having associative matrices which are of a size equal to the size of input pattern squared. It is also necessary to convert a two-dimensional pattern, such as an image, once into a one-dimensional pattern, and a capacity of the associated information storage is limited to a small amount, on such an order of 0.15 n when the size of the state of the neural networks is designated by "n".

SUMMARY OF THE INVENTION

It is therefore an object of this invention to eliminate the problems encountered by the prior-art devices and to provide an associative information storage device and an algorithm therefor, wherein it is possible to associate and store a pattern with use of two-dimensional associative matrices having the same size as that of an input pattern and it is possible to input a two-dimensional input pattern by utilizing the two-dimensional associative matrices without converting it into a one-dimensional pattern.

It is another object to provide an associative information storage device having an enlarged storage capacity.

It is still another object of this invention to provide a more robust associative information storage device and learning algorithm therefor, wherein associative matrices are generated from an input pattern so as to maximize the Hamming distance between the state invariants which correspond to each different storage pattern.

In the associative information storage device and the algorithm of the present invention, associative matrices are generated based on each input pattern upon every reception, and an aggregate of input patterns is converted, stored, categorized and associated in accordance with the state transition behavior of the associative information storage circuit, which behavior is obtained through a predetermined initial value, the state transition dynamics and the associative matrices generated from the input patterns.

Furthermore, the associative matrices based on the aggregate of the input patterns are computed by utilizing an optical system or the like and the result is input to the associative information storage circuit.

In the associative information storage algorithm of the present invention, a weighing matrix is determined through an appropriate computation based on the storage patterns and a supplementary matrix, and then the Hamming distance between invariants which correspond to each storage pattern is maximized by revising the supplementary matrix through a learning operation.

According to the present invention, when the associative information storage circuit is brought into operation with respect to the state transition from the preliminarily determined initial state, the transition state shows a behavior which depends on the associative matrices or the input pattern to determine the associative matrices. Consequently, it becomes practicable to transform or categorize the aggregate of the input patterns by recording the behavior of the transition state in accordance with an appropriate manner.

Further, in such case when aggregates of input patterns have little differences among correlated elements, since a mode of state transition from an initial state, which state is defined by an approximate continuity of the state transition in an associative matrix space, can be made as similar to each other as the similar associative matrices being generated, it is also possible to associate and categorize the aggregates of the input patterns.

Still further, in accordance with this invention, since a state input and a state output are varied gradually through the associative matrices while fixing an initial state, it may be considered, in the sense of the prior art associative information storage method, that the storage and association are implemented through the aggregate of the associative information storage neural networks, thus the storage capacity of the associative information storage device can be increased considerably as compared with that of the prior art device.

In another aspect of this invention, since the optical filter which constitutes the neural networks is two-dimensional to store the associative matrices, it is possible to increase the processing speed as well as integration by converting a two-dimensional input pattern and writing a converted output into the neural networks made up of the optical filter.

Still in another aspect of this invention, since a weight matrix of this invention consists of a storage pattern and supplementary matrix, it is possible to maximize the Hamming distance between state invariants which correspond to each storage pattern by revising the supplementary matrix through a learning function. Accordingly, a power of categorization that corresponds to each storage pattern can be enhanced, thus increasing the storage capability and robustness.

BRIEF DESCRIPTION OF THE DRAWINGS

FIG. 5 is another associative information storage device showing another embodiment of this invention.

DETAILED DESCRIPTION OF THE PREFERRED EMBODIMENTS

Now preferred embodiments of this invention will be described by referring to FIGS. 4 through 6.

[Embodiment 1]

Figure 1:
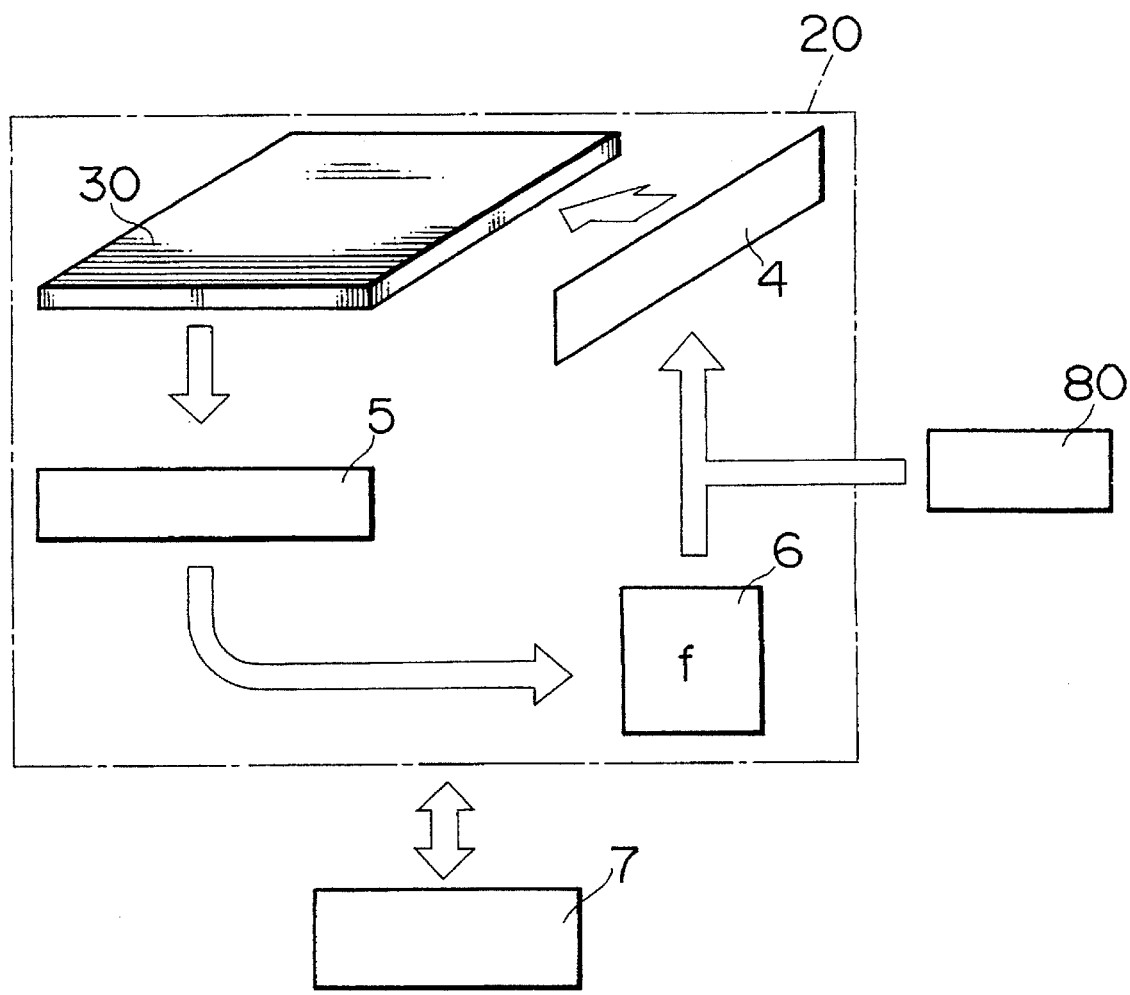
FIG. 1 is a diagram showing a conventional associative information storage device.
Figure 2:
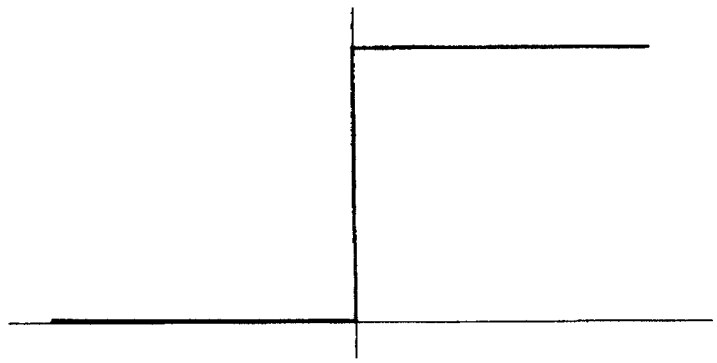
FIG. 2 is a characteristic diagram illustrating a nonlinear transform function of an associative information storage system.
Figure 3:
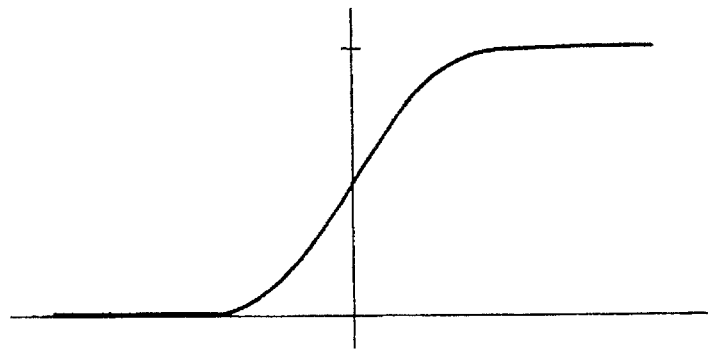
FIG. 3 is another characteristic diagram illustrating another nonlinear transform function of the associative information storage system.
Figure 4:
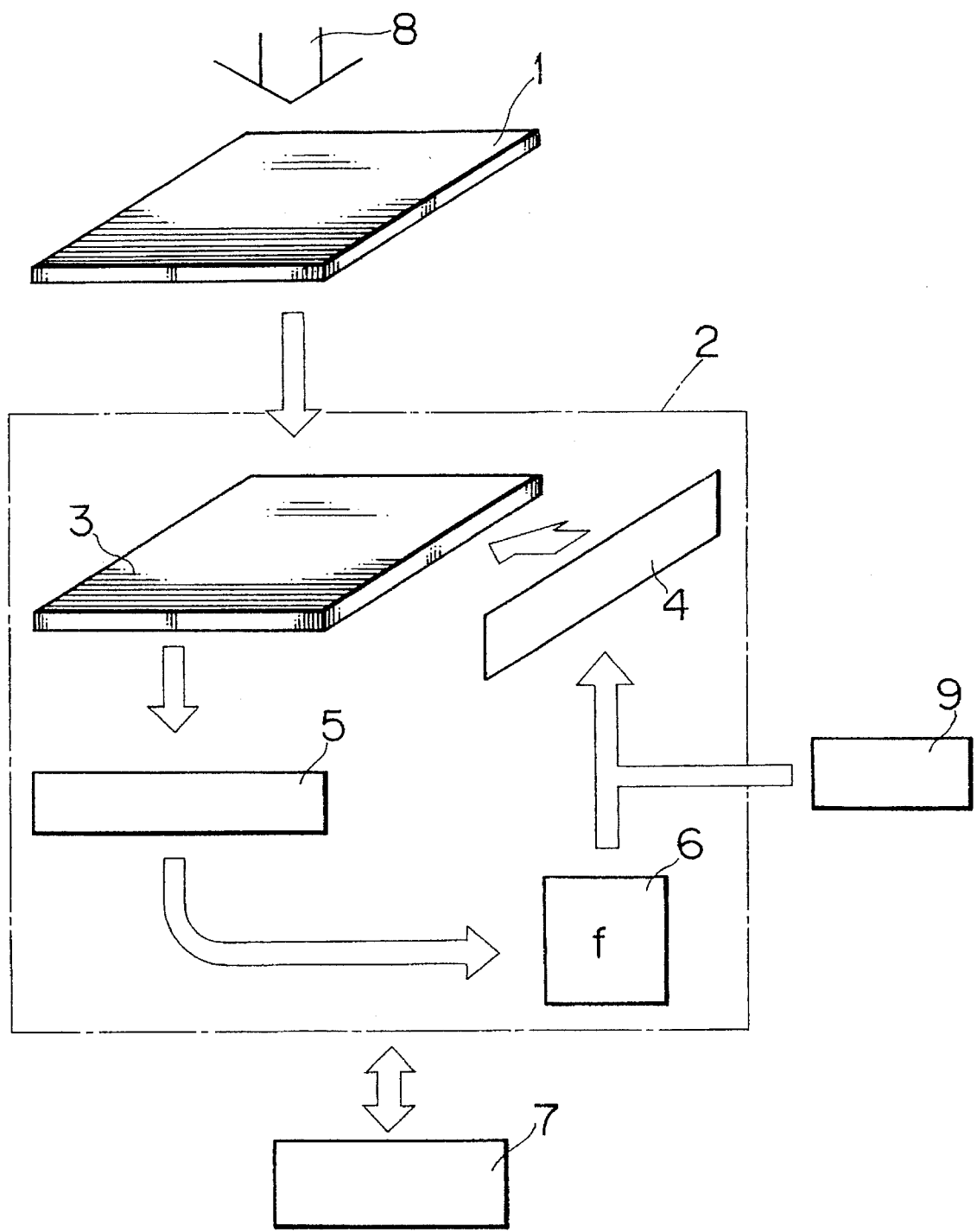
FIG. 4 is an associative information storage device showing one of the embodiments of this invention.

Referring first to FIG. 4, there is shown an associative information storage device embodying the present invention, wherein block 1 designates an associative matrix processing unit for computing the associative matrix based on an input pattern. An associative storage circuit 2 is formed of neural networks 3 to be fed with associative matrices from the associative matrix processing unit 1, a state input connecting unit 4, a state output connecting unit 5 and a conversion unit 6 of the type to perform a nonlinear transform on an output of the state output connecting unit 5, wherein an output of the conversion unit 6 is in turn fed to the state input connecting unit 4. Further, in FIG. 4, block 7 designates an external device, big arrow 8 designates an input pattern and block 9 designates an initial value input unit to provide the state input connecting unit 4 with a fixed data and the neural networks 3 with an initial input.

When the input pattern 8 is fed to the associative information storage device, the associative matrix processing unit 1 computes the associative matrices based on the input pattern 8. This processing may be implemented in parallel by utilizing an optical system from an image or two-dimensional input data or by utilizing a conventional computer. The resultant matrix is then written into the neural networks 3. A product of a fixed initial state input fed by the initial value input unit 9 and the associative matrices are calculated, and the resultant matrices are in turn fed to the state output connecting unit 5. An output of the state output connecting unit 5 is then converted into a new state input at the conversion unit 6 through the nonlinear transform function in accordance with equation 1. The converted new state input constitutes a state input in the succeeding time period.

Since the nonlinear transform function "f" of the conversion unit 6 and the initial state input are fixed, a state of the neural networks, or successive outputs of the state output connecting unit 5 are defined unalterably by the associative matrices being fed to the neural networks 3. Since the associative matrices can be defined unalterably by the input pattern 8, a state of the input of the state input connecting unit 4 or a state transition is also defined unalterably by the input pattern 8. Accordingly, the conversion of the input pattern 8 is performed by the acts of the conversion unit 6.

Especially, when the associative matrices fed to the neural networks 3 have symmetry, the input to the state input connecting unit 4 is guaranteed to converge to an invariant, thus each element of the aggregate of the input pattern 8 is coded in response to a respective convergence point and in turn the coded element is stored in the external device 7. In the foregoing processing, as the convergence points are defined independently based on the associative matrices prepared for every element of the aggregate of the input pattern 8, the limitation of capacity caused by the size "n" of the associative matrices of the prior art information storage device can be eliminated. In other words, the associative matrices may have a number of associative storages which is equal to that of the elements of the aggregate of the input pattern 8 since the associative matrices are defined by the elements of the aggregate of the input pattern 8, thus increasing the storage capacity considerably as compared with the conventional associative information storage device.

Further, according to the associative information storage device embodying the present invention, if it is assumed that a size of the input pattern 8 is "N", the input pattern 8 can be stored with a pattern having a size which is equivalent to the square root of the size "N".

Further, if the elements of the aggregate of the input pattern 8 are not very different from each other, the associative matrix processing unit 1 will be arranged such that corresponding associative matrices prepared by the elements of the aggregate of the input pattern 8 are also not very different from each other. Through this arrangement, the invariants to be created based on the fixed initial state through the processing of the associative matrices can be made completely identical to each other or not very different from each other. By making use of this feature, the categorization of the elements of the aggregate of the input pattern 8 can be realized. This is the use of stability of the invariants within the associative matrix space.

In this way, mutual differences of the elements of the aggregate of the input pattern 8 are converted into differences of the invariants. Through this conversion, such as reducing the mutual differences of the aggregate of the input pattern 8, it may become possible to associate or categorize the elements of the aggregate of the input pattern 8. That is, the mutual differences of the elements of the aggregate of the input pattern 8 are compressed and vanish in the act of categorizing the elements of the aggregate of the input pattern 8 into several classes.

[Embodiment 2]

In the first embodiment, a degree of compression of the mutual differences of the aggregate of the input pattern 8 is varied. With this arrangement, it is possible to vary a resolution of the categorization of the aggregate of the input pattern 8.

[Embodiment 3]

FIG. 5 is a schematic diagram of an associative information storage device showing another embodiment of this invention.

As seen, the aggregate of the input pattern 8 is fed to a plurality of associative information storage devices, which are of the type illustrated in the first embodiment and each of which has a different decision rule for associative matrices. Different outputs from each system are then combined for realizing the more accurate pattern categorization and storage. In FIG. 5, blocks 10₁, 10₂ . . . 10ₙ designates the associative information storage device illustrated in the first embodiment of this invention and each of which determines associative matrices upon receiving the input pattern 8.

[Embodiment 4]

The information may be further compressed in such a manner as performing a pattern conversion by impressing an output of the conversion unit 6 of the first embodiment onto a system of the type which has the same configuration as that of the first embodiment but the aggregate size of the input pattern 8 being equal to the square root of the size "N". This configuration can be expanded in an inductive manner.

[Embodiment 5]

Figure 6:
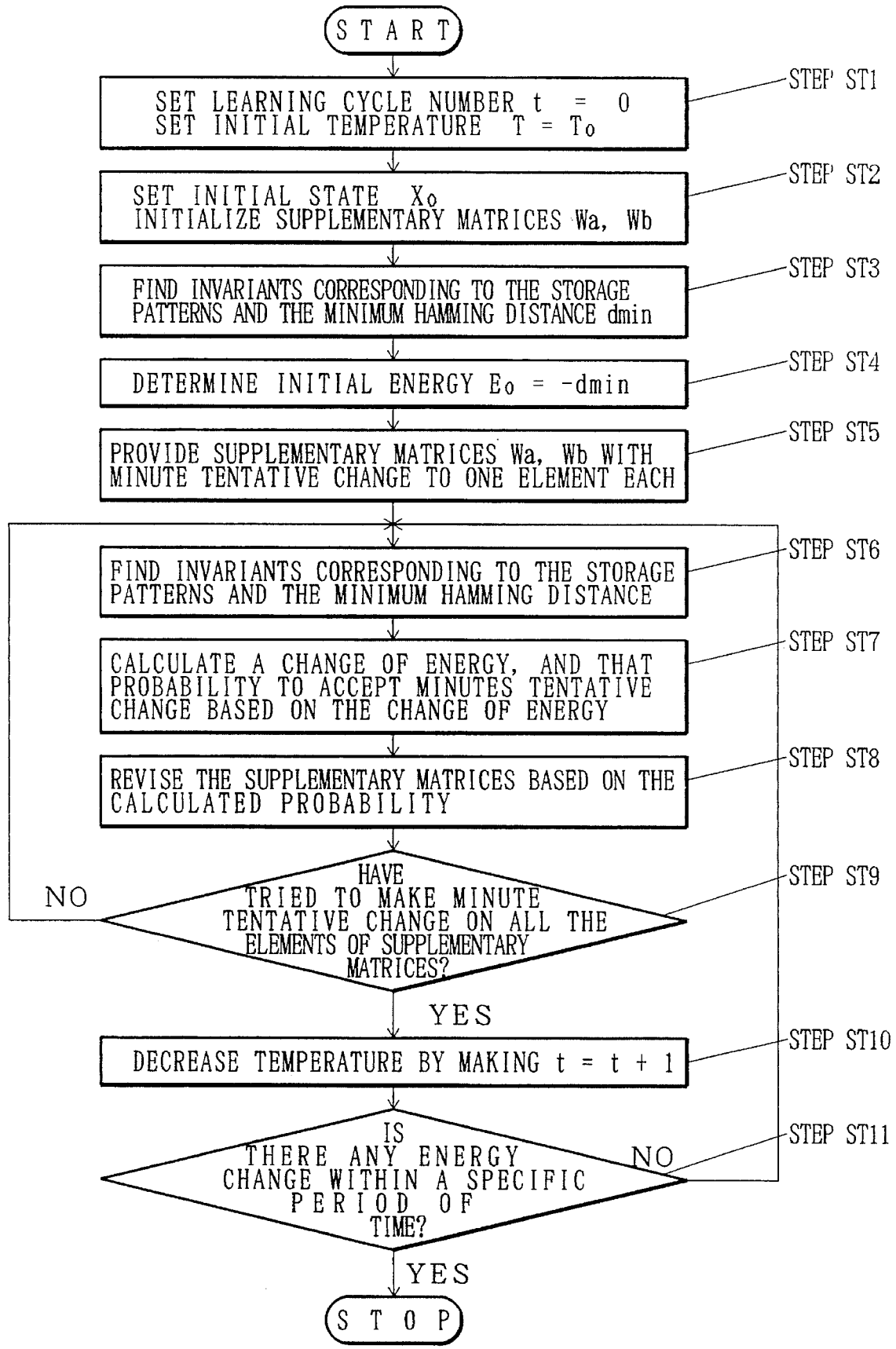
FIG. 6 is a flowchart illustrating the operation of learning algorithm of another associative information storage device embodying the present invention.

A learning algorithm of another associative information storage device embodying the present invention is shown by a flowchart of FIG. 6. According to this preferred embodiment, the associative matrix $W^s$ which corresponds to s-th storage pattern $A^s$ is given by the following equation:

$$W^s = W_a \otimes (A^s + A^{st}) + W_b \qquad (2)$$

where, $W_a$ and $W_b$ are symmetrical supplementary matrices, symbol $A^{st}$ indicates a transposed matrix, and combination of an open symbol o and cross x indicates an Adamal product.

According to this invention, when there are, for example, "M" storage patterns, associative matrices are formed in accordance with equation (2) by utilizing each pattern of "M", the state transition is commenced from a preliminarily determined initial state and state invariants at the time when the state transition reaches to a stable state are stored, hence the minimum Hamming distance between the state invariants is calculated. An energy E in the neural networks can be defined by the following equation with use of the calculated minimum Hamming distance.

$$E = -d_{min} \qquad (3)$$

where, $d_{min}$ is the minimum Hamming distance.

The learning function is implemented by revising the supplementary matrices in accordance with a pusedo-annealing method so as to increase the minimum Hamming distance or decreasing the energy E.

The learning algorithm of the preferred embodiments of this invention will now be described by referring to the flowchart shown in FIG. 6. Upon initiation of the operation, a learning cycle number of "t" is set to zero and a pusedo-annealing temperature is set to an initial temperature of $T_o$ at step ST1. Step ST2 randomly sets an initial state of the neural networks and initializes a value of each element of the supplementary matrices. At steps ST3 and ST4, associative matrices are formed for respective storage patterns in accordance with equation (2), the state transition of the neural networks is implemented in accordance with the state transition dynamics defined in equation (1) and then respective invariants are stored. Further, the minimum Hamming distance between the invariants is calculated and the result is assigned to an initial energy value of the neural networks. Step ST5 provides the supplementary matrices $W_a$ and $W_b$ with a minute tentative change to one element each based on the following equations.

$$\Delta W_a(i, j) = R \cdot \text{rand}(-1, 1) \qquad (4)$$

$$\Delta W_b(i, j) = R \cdot \text{rand}(-1, 1) \qquad (5)$$

where, R indicates a constant and rand (−1, 1) indicates a function to generate random numbers within a range of [−1, 1].

At step ST6, invariants corresponding to the storage patterns and the minimum Hamming distance thereof are found in accordance with the newly obtained supplementary matrix. Step ST7 calculates a change of energy in the neural networks with respect to the previous cycle and, then based on the result, calculates the probability of "P" to accept the minute tentative change in accordance with the following equation.

$$P = \frac{1}{1 + \exp(\Delta E/T(t))} \qquad (6)$$

where, $\Delta E$ indicates a change of energy and $T(t)$ indicates a temperature with a cycle of "t".

With use of this probability, step ST8 implements a real revision. It is then determined whether or not the minute tentative revision has been tried to all the elements of the supplementary matrices. If it has not, operational steps from ST5 to ST9 are repeated, whereas if it has, one ("1") is added to the cycle number "t" and the temperature is slightly decreased at step ST10 in accordance with the following equation.

$$T(t) = \frac{T_o}{\log(t+1)} \qquad (7)$$

A change of energy in the neural networks is observed at step ST11 for a predetermined period of time, for example, ten cycles. If there is, operational steps from ST5 to ST11 are repeated, whereas, if there is not, the program is brought to the end.

[Embodiment 6]

The associative matrices have been given by equation (3) in the above described preferred embodiments, however, the associative equation may be given by:

$$W^s = W_a A^s W_a^t + W_b \qquad (8)$$

where, $W_a$ indicates any matrix having a size of m×n, $A^s$ indicates a storage pattern having a size of n×n, $W_b$ indicates a symmetrical matrix having a size of m×m and $W_a^t$ indicates a transposed matrix.

As it has been described above, according to the associative information storage device of this invention, since the behavior of the state transition is recorded by making the associative information storage circuit initiate its state transition from a predetermined initial state, a storage capacity of the associative information storage device can be increased considerably, with a leap, as compared with that of the conventional devices.

Moreover, in accordance with the present invention, since the two-dimensional optical filter is employed to constitute the neural networks for storing the associative matrix, it is possible to improve substantially the speed of processing, the rate of integration and the like by converting the two-dimensional pattern and writing the converted pattern directly into the neural networks.

It is to be understood by those skilled in the art that the foregoing description relates only to a preferred embodiments of the present invention and that various changes and modifications may be made in the invention without departing from the spirit and scope thereof.

What is claimed is:

1. An associative information storage device comprising:
   an associative information storage circuit, including at least one neural network, for obtaining a state output from a state input by inputting associative matrices from a source exterior to said circuit and conversion means to obtain said state input for a succeeding time period by converting said state output using a nonlinear conversion;
   initial value input means for inputting a fixed initial state to said associative information storage circuit;
   storage means for storing progression of state transitions of said associative information storage circuit; and
   associative matrix processing means for generating associative matrices of said neural network based on an input pattern.

2. An associative information storage device as defined in claim 1, wherein said neural network enables said associative matrices to be stored optically, wherein said associative matrices are generated optically based on said input pattern and fed to said associative information storage circuit.

3. An associative information storage device as defined in claim 1, wherein said neural network enables said associative matrices to be stored electronically, wherein said associative matrices are generated electronically based on said input pattern and fed to said associative information storage circuit.

4. An associative information storage device comprising:
   an associative matrix processing unit for computing an associative matrix based on an input pattern;
   neural networks for receiving said associative matrix from said associative matrix processing unit;
   an initial value input unit for inputting a predetermined fixed initial input value to said neural networks as a predetermined initial state;
   a state output connecting unit for receiving an output from said neural networks after a first state transition which is a product of said predetermined fixed initial input value and said associative matrix and outputting a result; and
   a conversion unit for converting the result from said state output connecting unit using a nonlinear conversion function to produce a converted result.

5. A device as claimed in claim 4 wherein said associative matrix in said neural networks is changed during said first state transition.

6. A device as claimed in claim 5 further comprising means, connected to said conversion means, for inputting said converted result to said neural networks as an updated input value;
   wherein said neural networks undergo a second state transition to produce a second output.

7. A method of storing associative information comprising the steps of:
   computing an associative matrix of a neural network on the basis of an input pattern;
   loading the computed associative matrix into said neural network as an associative matrix of said neural network;
   inputting a predetermined initial state into said neural network as an initial state of said neural network;
   causing said neural network to undergo a progression of state transitions starting with said predetermined initial state and said loaded associative matrix; and
   storing associative information associating said input pattern and said progression of state transitions.

8. A method as claimed in claim 7 wherein said associative matrix changes during said progression of state transitions.

9. A method as claimed in claim 7 wherein said associative matrix is not set during a recognition phase of operation of said neural network.

\* \* \* \* \*